US012603746B2

(12) United States Patent
Li et al.

(10) Patent No.: US 12,603,746 B2
(45) Date of Patent: Apr. 14, 2026

(54) METHOD FOR TRANSMITTING CHANNEL STATE INFORMATION, AND COMMUNICATION NODE AND STORAGE MEDIUM

(71) Applicant: ZTE Corporation, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 344 days.

(21) Appl. No.: 18/576,090

(22) PCT Filed: May 26, 2022

(86) PCT No.: PCT/CN2022/095289
§ 371 (c)(1),
(2) Date: Jan. 2, 2024

(87) PCT Pub. No.: WO2023/000816
PCT Pub. Date: Jan. 26, 2023

(65) Prior Publication Data
US 2024/0313920 A1 Sep. 19, 2024

(30) Foreign Application Priority Data
Jul. 20, 2021 (CN) .......................... 202110817839.4

(51) Int. Cl.
*H04L 5/00* (2006.01)
(52) U.S. Cl.
CPC .................................. *H04L 5/0051* (2013.01)
(58) Field of Classification Search
CPC ....................................................... H04L 5/005
(Continued)

(56) References Cited

U.S. PATENT DOCUMENTS

2014/0241274 A1 8/2014 Lee et al.
2014/0286182 A1 9/2014 Chen et al.
(Continued)

FOREIGN PATENT DOCUMENTS

CN       105359425 A    2/2016
CN       105359425 B    12/2018
(Continued)

OTHER PUBLICATIONS

International Search Report and Written Opinion for International Application No. PCT/CN2022/095289, mailed Aug. 19, 2022.
(Continued)

*Primary Examiner* — Chuck Huynh
(74) *Attorney, Agent, or Firm* — Wolf, Greenfield & Sacks, P.C.

(57) ABSTRACT

A method for transmitting channel state information, and a communication node and a storage medium are disclosed. The method may include, receiving configuration information sent by a second communication node; receiving CSI-RS sent by the second communication node according to the configuration information; measuring the CSI-RS to obtain the CSI, and transmitting the CSI to the second communication node; where the CSI may include a precoding matrix; the configuration information is indicative of a number of CSI-RS antenna ports and a number of antenna ports onto which the precoding matrix is expected to be applied; and the number of CSI-RS antenna ports is smaller than the number of antenna ports onto which the precoding matrix is expected to be applied.

20 Claims, 3 Drawing Sheets

(58) Field of Classification Search
USPC ......................................................... 370/329
See application file for complete search history.

(56) References Cited

U.S. PATENT DOCUMENTS

| | | | |
|---|---|---|---|
| 2018/0083681 A1* | 3/2018 | Faxér ................... | H04B 7/0479 |
| 2019/0379514 A1 | 12/2019 | Lee et al. | |
| 2021/0211173 A1 | 7/2021 | Rahman et al. | |

FOREIGN PATENT DOCUMENTS

| | | | | |
|---|---|---|---|---|
| CN | 110912589 A | 3/2020 | | |
| CN | 111106917 A | 5/2020 | | |
| WO | WO-2017128800 A1 * | 8/2017 | ........... | H04B 7/0452 |

OTHER PUBLICATIONS

Extended European Search Report for European Application No. 22844983.1, dated Jun. 2, 2025.

* cited by examiner

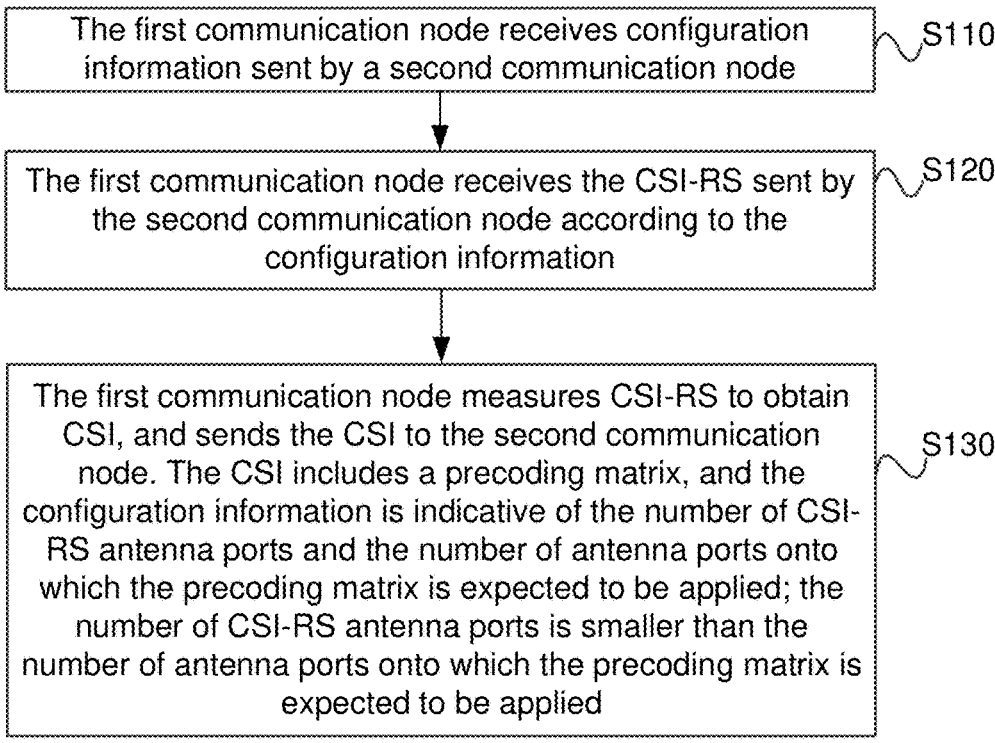

The first communication node receives configuration information sent by a second communication node — S110

The first communication node receives the CSI-RS sent by the second communication node according to the configuration information — S120

The first communication node measures CSI-RS to obtain CSI, and sends the CSI to the second communication node. The CSI includes a precoding matrix, and the configuration information is indicative of the number of CSI-RS antenna ports and the number of antenna ports onto which the precoding matrix is expected to be applied; the number of CSI-RS antenna ports is smaller than the number of antenna ports onto which the precoding matrix is expected to be applied — S130

FIG. 1

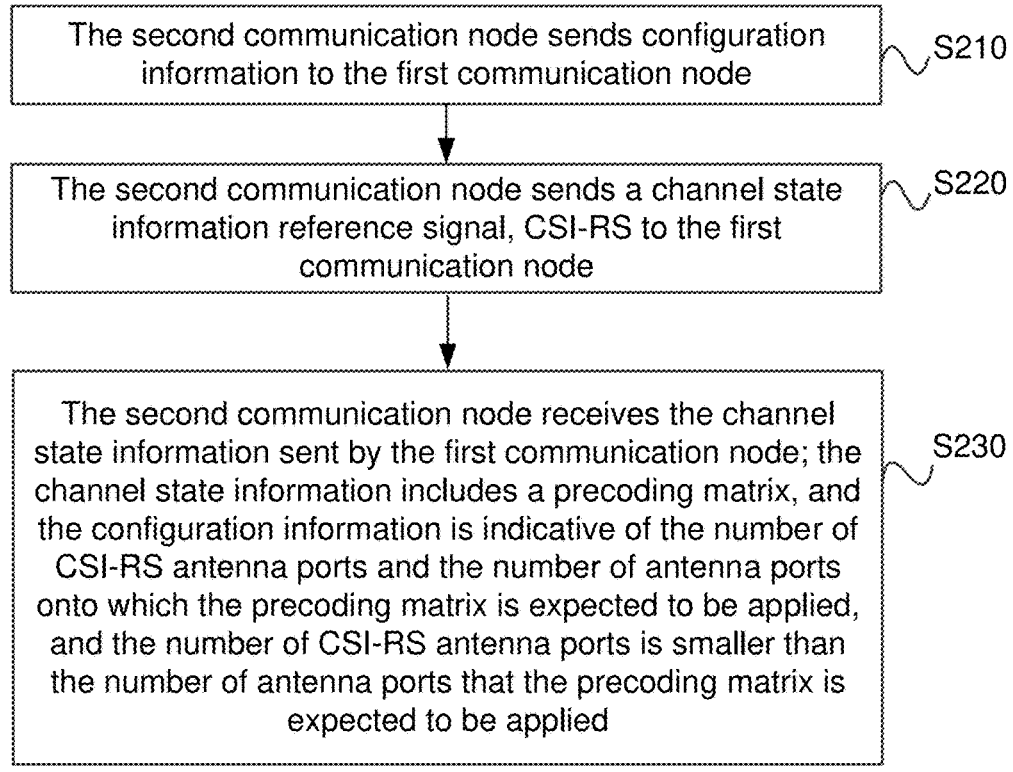

The second communication node sends configuration information to the first communication node — S210

The second communication node sends a channel state information reference signal, CSI-RS to the first communication node — S220

The second communication node receives the channel state information sent by the first communication node; the channel state information includes a precoding matrix, and the configuration information is indicative of the number of CSI-RS antenna ports and the number of antenna ports onto which the precoding matrix is expected to be applied, and the number of CSI-RS antenna ports is smaller than the number of antenna ports that the precoding matrix is expected to be applied — S230

FIG. 2

METHOD FOR TRANSMITTING CHANNEL STATE INFORMATION, AND COMMUNICATION NODE AND STORAGE MEDIUM

CROSS-REFERENCE TO RELATED APPLICATION

This application is a national stage filing under 35 U.S.C. § 371 of international application number PCT/CN2022/ 095289, filed May 26, 2022, which claims priority to Chinese patent application No. 202110817839.4 filed Jul. 20, 2021. The contents of these applications are incorporated herein by reference in their entirety.

TECHNICAL FIELD

The present disclosure relates to a wireless communication network, and in particular, to a method for transmitting channel state information (CSI), a communication node, and a storage medium.

BACKGROUND

In the field of wireless communication, with the increase of the number of transmitting antennas in base stations, the gain (such as throughput, spectral efficiency, etc.) increases. However, at the same time, the overhead of transmitting channel-state information reference signal (CSI-RS) due to the acquisition of the CSI is further increased, which will offset the gain brought by the increase in the number of transmitting antennas in the base stations. In addition, different base stations may have different numbers of transmitting antenna ports. That is, a terminal device may communicate with different base stations having different numbers of transmitting antenna ports. It is important to improve the communication efficiency between terminal devices and base stations having more antenna ports.

SUMMARY

Provided are a method for transmitting channel state information, a communication node, and a storage medium in some embodiments of the present disclosure.

An embodiment of the present disclosure provides a method for transmitting channel state information (CSI), which is applied to a first communication node, the method may include, receiving configuration information sent by a second communication node; receiving a channel state information reference signal (CSI-RS) sent by the second communication node according to the configuration information; measuring the CSI-RS to obtain the CSI, and transmitting the CSI to the second communication node; where the CSI may include a precoding matrix, and the configuration information is indicative of a number of CSI-RS antenna ports and a number of antenna ports onto which the precoding matrix is expected to be applied; and the number of CSI-RS antenna ports is smaller than the number of antenna ports onto which the precoding matrix is expected to be applied.

An embodiment of the present disclosure provides a method for transmitting channel state information (CSI), which is applied to a second communication node, the method may include, transmitting configuration information to a first communication node; transmitting a channel state information reference signal (CSI-RS) to the first communication node; and receiving the CSI sent by the first communication node; where the CSI may include a precoding matrix, and the configuration information is indicative of a number of CSI-RS antenna ports and a number of antenna ports onto which a precoding matrix is expected to be applied, and the number of the CSI-RS antenna ports is smaller than the number of antenna ports onto which the precoding matrix is expected to be applied.

An embodiment of the present disclosure provides a communication node, which may include a processor configured to carry out the method according to any one of the embodiments described above when executing a computer program.

An embodiment of the present disclosure provides a computer-readable storage medium storing at least one computer program which, when executed by a processor, causes the processor to carry out any one of the methods according to any one of the embodiments described above.

With regard to the above embodiments and other aspects of the present disclosure and their implementations, more illustrations are provided in the attached drawings, detailed description, and claims.

BRIEF DESCRIPTION OF DRAWINGS

FIG. 1 depicts a flowchart showing a method for transmitting channel state information (CSI) according to an embodiment of the present disclosure;

FIG. 2 depicts a flowchart showing another method for transmitting CSI according to an embodiment of the present disclosure;

DETAILED DESCRIPTION

Figure 3:
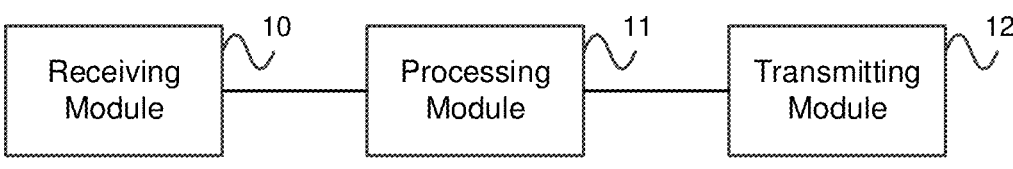
FIG. 3 depicts a schematic diagram showing a device for transmitting CSI according to an embodiment of the present disclosure.

Some embodiments of the present disclosure will be illustrated with reference to the drawings below.

The wireless communication network technology has now developed to the fifth generation (5th Generation, 5G) of mobile communication technology. Long Term Evolution (LTE) technology in the 4th Generation (4G) and New Radio (NR) technology in 5G are both based on orthogonal frequency division multiplexing (OFDM). In OFDM technology, the smallest unit in the frequency domain is a subcarrier and the smallest unit in the time domain is an OFDM symbol. In order to facilitate the utilization of the frequency domain resources, Resource Block (RB) and Bandwidth part (BWP) are defined. One RB is defined as a specific number of consecutive subcarriers. One BWP is defined as another specific number of consecutive resource blocks on a carrier. In order to facilitate the utilization of the time domain resources, the slot is defined, and one slot is defined as another specific number of consecutive OFDM symbols.

The existing methods of obtaining and utilizing CSI in wireless communication systems typically include the following four operations.

1. A base station sends a reference signal to a terminal device.

The reference signal is a downlink reference signal. The downlink reference signal for CSI reporting in an LTE system includes at least one of, Cell-specific Reference Signal (CRS) or, CSI-RS. The downlink reference signal for CSI reporting in an NR system includes CSI-RS.

2. The terminal device receives the reference signal and measures the reference signal to determine the CSI information from the base station to the terminal device.

3. The terminal device reports the CSI to the base station.

4. The base station receives the CSI, determines the data transmission strategy according to the channel state represented by the CSI, and transmits data, thus improving the efficiency of data transmission.

The accuracy of the channel state represented by the CSI affects the data transmission strategy of the base station, thus affecting the efficiency of data transmission. At the same time, the base station needs to occupy the overhead of downlink resources when sending the reference signal. And the terminal device also needs to occupy the overhead of uplink resources when uploading CSI.

With the increase in the number of transmitting antennas in base stations, the gain (such as throughput, spectral efficiency, etc.) increases. However, at the same time, the overhead of transmitting channel-state information reference signal (CSI-RS) due to the acquisition of the CSI is further increased, which will offset the gain brought by the increase in the number of transmitting antennas in the base stations. In addition, different base stations may have different numbers of transmitting antenna ports. That is, a terminal device may communicate with different base stations having different numbers of transmitting antenna ports. It is important to improve the communication efficiency between terminal devices and base stations having more antenna ports.

An embodiment of the present disclosure provides a mobile communication network (including but not limited to a 5G network). The network architecture of the network may include a terminal device and an access network device. The terminal device is wirelessly connected with the access network device, and the terminal device can be a fixed terminal device or a mobile terminal device. Provided are a method for transmitting CSI, a communication node, and a storage medium in some embodiments of the present disclosure, which can be implemented over the mobile communication network as discussed above, and which can improve the communication efficiency between a terminal device and a base station having a large number of antenna ports.

An access network device is an access device via which a terminal device wirelessly accesses the mobile communication system. An access network device can be a base station, an evolved NodeB (eNodeB), a transmission reception point (TRP), a next-generation NodeB (gNB) in a 5G mobile communication system, a base station in a future mobile communication system or an access node in a Wi-Fi system. An access network device can also be a module or unit that completes some functions of a base station. For example, an access network device can be a centralized unit (CU) or a distributed unit (DU). No limitation is put on the technology and the form adopted by the access network device in various embodiments of the present disclosure. In the present disclosure, an access network device can be referred to as a network device for short. And a network device refers to an access network device, unless otherwise specified.

A terminal device can also be called a terminal, user equipment (UE), mobile station, mobile terminal, etc. A terminal device can be a mobile phone, a tablet computer, a computer with a wireless transceiver, a virtual reality terminal device, an augmented reality terminal device, a wireless terminal device in industrial control, a wireless terminal device in unmanned driving, a wireless terminal device in remote surgery, a wireless terminal device in smart grid, a wireless terminal device in transportation safety, a wireless terminal device in smart city, a wireless terminal device in smart home, or the like. No limitation is put on the technology and the form adopted by the terminal device in various embodiments of the present disclosure.

In the following, a method for transmitting CSI, and a communication node, and their technical effects are described.

FIG. 1 depicts a schematic flowchart showing a method for transmitting channel state information (CSI) according to an embodiment. As shown in FIG. 1, the method is applicable to a first communication node (such as UE), and the method includes the following operations.

At S110, the first communication node receives configuration information sent by a second communication node.

The configuration information includes or consists of multiple parts. One part is the configuration information about channel state information reference signal (CSI-RS), and the other part is the configuration information about reporting the CSI.

Accordingly, "according to the configuration information" involved in the following operation S120 may be based on one part of the configuration information or multiple parts of the configuration information.

At S120, the first communication node receives the CSI-RS sent by the second communication node according to the configuration information.

The CSI-RS is carried by a channel state information reference signal resource (CSI-RS Resource). The CSI-RS Resource is composed of a code division multiple group (CDM group). And one CDM group is composed of radio resource elements, and CSI-RS of a group of CSI-RS antenna ports are multiplexed thereon by code division multiplexing.

At S130, the first communication node measures CSI-RS to obtain CSI, and sends the CSI to the second communication node. The CSI includes a precoding matrix, and the configuration information is indicative of the number of CSI-RS antenna ports and the number of antenna ports onto which the precoding matrix is expected to be applied. The number of CSI-RS antenna ports is smaller than the number of antenna ports onto which the precoding matrix is expected to be applied.

The CSI sent to the second communication node by the first communication node is generated according to the requirements of the configuration information.

In an embodiment, the CSI may further include at least one of, a channel quality indicator (CQI) that is indicative of the quality of a channel, or a precoding matrix indicator (PMI) that is indicative of the precoding matrix applied to the antenna of the second communication node.

In an embodiment, the reporting format of the CQI generally includes the following two types.

The first type is wideband CQI reporting. That is, a channel quality is reported for the channel state information reporting band (CSI reporting band). The channel quality corresponds to the entire CSI reporting band.

The second type is subband CQI reporting. That is, a channel quality is provided for each subband of the CSI reporting band (one channel quality corresponds to one subband). That is, one channel quality is reported for each subband of the CSI reporting band.

In particular, a subband is a unit in the frequency domain, defined as N consecutive RBs, where N is a positive integer. For the convenience of description, in the present disclosure, a subband is called a channel quality indicator subband, or CQI subband, or subband, and N is called the size of CQI subband, or CQI subband size, or subband size. A BWP is divided into sub-bands, and the CSI reporting band is defined by a subset of sub-bands of a BWP. The CSI reporting band is the band having thereon the CSI to be reported.

In an embodiment, the reporting format of PMI also generally includes the following three types.

The first type is wideband PMI reporting, that is, one PMI is reported for the CSI reporting band. The PMI corresponds to the entire CSI reporting band.

The second type is subband PMI reporting, that is, one PMI is reported for each subband of the CSI reporting band, or one PMI component is reported for each subband of the CSI reporting band. For example, the PMI consists of X1 and X2. Reporting one PMI for each subband of the CSI reporting band can be, reporting one X1 for the entire band and one X2 is reported for each subband. And reporting one PMI component for each subband of the CSI reporting band can be reporting one X1 and one X2 for each subband.

The third type is that the reported PMI indicates R precoding matrices for each subband, where R is a positive integer. In the sense of feeding back the frequency domain granularity of the precoding matrix, R in turn denotes the number of precoding matrix subbands included in each subband, or the number of precoding matrix subbands included in each CQI subband.

In an embodiment, the precoding matrix can be determined by a first set of vectors, or by a first set of vectors and a second set of vectors; where the first set of vectors includes L vectors, and the second set of vectors includes M vectors, and both L and M are positive integers.

Alternatively, the precoding matrix may be composed of a first set of vectors, or may be composed of a first set of vectors and a second set of vectors. In the case that the precoding matrix is composed of a first set of vectors, an example of one layer is: $W=W1*W2$, where W denotes the precoding matrix; W1 denotes the matrix composed of the first group of vectors; and W2 denotes the coefficients that combine the first set of vectors to form the precoding matrix, which is expressed as a matrix. In the case that the precoding matrix is composed of a first set of vectors and a second set of vectors, an example of one layer is: $W=W1*W2*WF$, where W denotes the precoding matrix, W1 denotes the matrix composed of the first set of vectors, WF denotes the matrix composed of the second set of vectors, and W2 denotes the coefficients that combine the first set of vectors and the second set of vectors to form the precoding matrix, which is expressed as a matrix.

In an embodiment, the first communication node may determine the channel quality in any one of the following two schemes, scheme #1, or scheme #2.

Scheme #1: The first communication node determines the channel quality according to the strength of the received CSI-RS.

Scheme #2: The first communication node determines the channel quality according to the signal-to-interference-noise ratio of the received CSI-RS.

If the channel quality does not vary much over the CSI reporting band, reporting the CQI by wideband CQI reporting can reduce the resource overhead for CQI reporting. If the channel quality varies significantly in the frequency domain, reporting CQI by subband CQI reporting can increase the accuracy of CQI reporting.

In the present disclosure, the first communication node is not expected to communicate with a fixed second communication node, but is expected to communicate with different second communication nodes. For example, during a period of time, a first communication node communicates with a second communication node A at a first location; while during another period of time, the first communication node communicates with a second communication node B at a second location. These second communication nodes may have different numbers of antenna ports (generally referred to as transmitting antenna ports).

When one of the second communication nodes has fewer antenna ports, each of the antenna ports transmits CSI-RS, so that the first communication node measures CSI-RS corresponding to a respective antenna port, obtains CSI corresponding to the respective antenna port, and feeds back the CSI corresponding to the respective antenna port. In this case, transmitting CSI-RS does not occupy too much overhead, and the feedback CSI corresponding to all antenna ports has high accuracy, so that efficient communication can be carried out by means of the transmitting antenna ports of the second communication node.

When some of the second communication nodes have more antenna ports, and in a case, each of the antenna ports transmits CSI-RS, so that the first communication node measures CSI-RS corresponding to a respective antenna port, obtains CSI corresponding to the respective antenna port, and feeds back the CSI corresponding to the respective antenna port. In this case, transmitting CSI-RS will occupy too much overhead, thus reducing the efficiency of communication by means of the transmitting antennas of the second communication node.

When some of these second communication nodes have a relatively large number of antenna ports, and in a case, the second communication nodes having a relatively large number of antenna ports only utilize part of the antenna ports to transmit CSI-RS, such that the first communication node measures the CSI-RS transmitted by the part of the antenna ports to obtain the CSI of the part of the antenna ports transmitting CSI-RS, and then estimates the CSI corresponding to all of the antenna ports through the CSI of these part of the antenna ports, and feeds back the CSI of all of the antenna ports. In this case, although the CSI corresponding to all of the antenna ports is estimated by the CSI of part of the antenna ports, with accuracy lost, but the overhead in transmitting CSI-RS is reduced, thus comprehensively improving the communication efficiency by means of the transmitting antennas of the second communication node.

Specifically, the antenna ports transmitting CSI-RS are the CSI-RS antenna ports; all of the transmitting antenna ports are the antenna ports onto which the precoding matrix is expected to be applied.

The scheme set forth in the present disclosure can solve the problem resulting from the uncertainty in the number of transmitting antenna ports of a base station that a terminal device may connected to. The scheme facilitates the full utilization of the transmitting antenna ports of the base station having a relatively large number of transmitting antennas, to improve communication efficiency. The scheme provided by the present disclosure can also prevent the terminal device from misjudging (for example, the situation that all transmitting antenna ports transmit CSI-RS may be misjudged as the situation that part of the transmitting antenna ports transmit CSI-RS, thus feeding back incorrect CSI; for another example, the situation that part of the transmitting antenna ports transmit CSI-RS may be misjudged as the situation that all transmitting antenna ports transmit CSI-RS, thus feeding back the incorrect CSI).

In an embodiment, the configuration information is further indicative of the correspondence between the CSI-RS antenna port and the antenna port onto which the precoding matrix is expected to be applied.

For example, the configuration information indicates which part of the antenna ports onto which the precoding matrix is expected to be applied, serve as CSI-RS antenna ports.

For another example, the indices of the antenna ports onto which the precoding matrix is expected to be applied, are 0, 1, ..., N−1. The indices of the CSI-RS antenna ports are 0, 1, ..., K−1. The configuration information indicates which of the indices among 0, 1, ..., N−1 of the antenna ports onto which the precoding matrix is expected to be applied, correspond to the indices 0, 1, ..., K−1 of the CSI-RS antenna ports. In some examples, the configuration information indicates that the indices 0, 1, ..., K−1 of the indices 0, 1, ..., N−1 of the antenna ports on which the precoding matrix is expected to be applied, correspond to the indices 0, 1, ..., K−1 of the CSI-RS antenna ports. Alternatively, the configuration information indicates that the indices N−K, N−K+1, ..., N−1 of the indices 0, 1, ..., N−1 of the antenna ports on which the precoding matrix is expected to be applied, correspond to the indices 0, 1, ..., K−1 of the CSI-RS antenna ports. Alternatively, the configuration information indicates that the indices D, D+1, ..., D+K−1 of the indices 0, 1, ..., N−1 of the antenna ports on which the precoding matrix is expected to be applied, correspond to the indices 0, 1, ..., K−1 of the CSI-RS antenna ports. Alternatively, the configuration information indicates that the indices D, D+d, ..., D+(K−1)d of the indices 0, 1, ..., N−1 of the antenna ports on which the precoding matrix is expected to be applied, correspond to the indices 0, 1, ..., K−1 of the CSI-RS antenna ports.

For another example, the antenna ports on which the precoding matrix is expected to be applied are grouped into M group, each group includes K antenna ports, and the configuration information indicates that the antenna ports of one of the M groups serve as CSI-RS antenna ports.

N, K, d and M discussed above are all positive integers, while D is a non-negative integer.

The configuration information is indicative of the correspondence between the CSI-RS antenna port and the antenna port onto which the precoding matrix is expected to be applied, which is beneficial for the terminal device to estimate the CSI corresponding to the antenna port onto which the precoding matrix is expected to be applied according to the channel state information measured from the CSI-RS antenna port. For example, the channel coefficient corresponding to the antenna ports onto which the precoding matrix is expected to be applied, is estimated from the channel coefficient measured on the CSI-RS antenna ports, thereby estimating the precoding matrix corresponding to the antenna port onto which the precoding matrix is expected to be applied. As such, the accuracy of the channel state information and thus the performance are improved, and the complexity of the coefficient is reduced.

In an embodiment, the correspondence between the CSI-RS antenna port and the antenna port onto which the precoding matrix is expected to be applied is indicated by any one of the following schemes #1-3.

Scheme #1: The correspondence between CSI-RS antenna ports and antenna ports onto which the precoding matrix is expected to be applied, is indicated by a bitmap, where a bit in the bitmap indicates an antenna port onto which the precoding matrix is expected to be applied, and a specific bit in the bitmaps indicate a CSI-RS antenna port.

In some examples, the specific bit is a non-zero bit.

For example, the number of antenna ports onto which the precoding matrix is expected to be applied is N, and the number of bits in the bitmap is N. Each of the bits in the bitmap corresponds to a respective one of the antenna ports onto which the precoding matrix is expected to be applied, and non-zero bits in the bitmap indicate the CSI-RS antenna ports.

For another example, the number of antenna ports onto which the precoding matrix is expected to be applied is N, the number of CSI-RS antenna ports is K, and the number of bits in the bitmap is M. One bit in the bit map corresponds to K antenna ports onto which the precoding matrix is expected to be applied, and the non-zero bit in the bit map indicates the CSI-RS antenna ports. That is, a non-zero bit in the bit map indicates K CSI-RS antenna ports.

For another example, the number of antenna ports onto which the precoding matrix is expected to be applied is N, the number of CSI-RS antenna ports is K, and the number of bits in the bit map is M. One bit in the bit map corresponds to W antenna ports onto which the precoding matrix is expected to be applied, and the non-zero bits in the bit map indicate the CSI-RS antenna ports. That is, all non-zero bits in the bit map indicate K CSI-RS antenna ports, and W is an integer less than K and greater than 1.

Scheme #2: The correspondence between CSI-RS antenna ports and antenna ports onto which the precoding matrix is expected to be applied, is indicated by one integer, and the integer indicates the part of the antenna ports served as CSI-RS antenna ports among the antenna ports onto which the precoding matrix is expected to be applied.

For example, the number of antenna ports onto which the precoding matrix is expected to be applied is N, and the number of CSI-RS antenna ports is K. The antenna ports onto which the precoding matrix is expected to be applied, are grouped into M groups. Each group includes K CSI-RS antenna ports, and corresponds to an index or an integer. A group of antenna ports corresponding to an integer is indicated by the integer, as the CSI-RS antenna ports. Alternatively, A group of antenna ports corresponding to an index is indicated by the index, as the CSI-RS antenna ports.

Scheme #3: One correspondence is selected from at least one preset correspondence as the correspondence between the CSI-RS antenna ports and the antenna ports onto which the precoding matrix is expected to be applied.

For example, M preset correspondences are provided between the CSI-RS antenna ports and the antenna ports onto which the precoding matrix is expected to be applied, and one of the M preset correspondence is selected as the correspondence between the CSI-RS antenna ports and the antenna ports onto which the precoding matrix is expected to be applied.

For another example, the number M of the preset correspondences between the CSI-RS antenna ports and the antenna ports onto which the precoding matrix is expected to be applied is determined according to the number K of the CSI-RS antenna ports. Corresponding to one number of CSI-RS antenna ports, one correspondence is selected as the correspondence between the CSI-RS antenna ports and the antenna ports onto which the precoding matrix is expected to be applied, from the preset correspondences between the CSI-RS antenna ports and the antenna ports onto which the precoding matrix is expected to be applied.

N, K, M and W as discussed above are all positive integers.

In an embodiment, the correspondence between CSI-RS antenna ports and antenna ports onto which the precoding matrix is expected to be applied, is determined by the number of antenna ports onto which the precoding matrix is expected to be applied and the number of CSI-RS antenna ports.

For example, the number of antenna ports onto which the precoding matrix is expected to be applied is N, with the indices being $0, 1, \ldots, N-1$. The number of CSI-RS antenna ports is K, with the indices being $0, 1, \ldots, K-1$. The antenna ports onto which the precoding matrix is expected to be applied with the indices D, D+d, $\ldots$, D+(K−1)d correspond to the CSI-RS antenna ports with indices $0, 1, \ldots, K-1$. d=N/K, D=0, 1, $\ldots$, d−1, or D is a non-negative integer less than d. In some examples, when D=0, the antenna ports onto which the precoding matrix is expected to be applied with indices 0, d, $\ldots$, (K−1) d correspond to the CSI-RS antenna ports with the indices $0, 1, \ldots, K-1$.

For another example, the number of antenna ports onto which the precoding matrix is expected to be applied is N, with the indices being $0, 1, \ldots, N-1$. The number of CSI-RS antenna ports is K, with the indices being $0, 1, \ldots, K-1$. The antenna ports onto which the precoding matrix is expected to be applied with the indices {D, D+1, $\ldots$, D+Q−1} {D+d, D+d+1, $\ldots$, D+d+Q−1}, $\ldots$, {D+(K/Q−1)d, D+(K/Q−1) d+1, $\ldots$, D+(K/Q−1)d+Q−1} correspond to the CSI-RS antenna ports with indices $0, 1, \ldots, K-1$. Q is a positive integer less than K, d=QN/K, D=0, 1, $\ldots$, d−Q, or D is a non-negative integer less than d−Q. In some examples, when D=0, the antenna ports onto which the precoding matrix is expected to be applied with indices {0, 1, $\ldots$, Q−1}, {d, d+1, $\ldots$, d+Q−1}, $\ldots$, {(K/Q−1)d, (K/Q−1)d+1, $\ldots$, (K/Q−1)d+Q−1} correspond to the CSI-RS antenna ports with the indices $0, 1, \ldots, K-1$.

N and K are positive integers.

In an embodiment, the number of antenna ports onto which the precoding matrix is expected to be applied is P times the number of CSI-RS antenna ports, where P is an integer greater than 1.

For example, the value of P can be 2, 3, 4, or 5; and can also be 2k, where k is a positive integer.

In an embodiment, the configuration information is further indicative of, the correspondence between the CSI-RS antenna ports located in the first dimension in space and the antenna ports located in the first dimension in space onto which the precoding matrix is expected to be applied, and the correspondence between the CSI-RS antenna ports located in second dimension in space and the antenna ports located in the second dimension in space onto which the precoding matrix is expected to be applied.

For example, the configuration information indicates which part of the antenna ports located in the first dimension in space onto which the precoding matrix is expected to be applied, are served as the CSI-RS antenna ports located in the first dimension in space; and indicates which part of the antenna ports located in the second dimension in space onto which the precoding matrix is expected to be applied, are served as the CSI-RS antenna ports located in the second dimension in space. As such, the correspondence between CSI-RS antenna ports and the transmitting antenna ports onto which the precoding matrix is expected to be applied, can be obtained according to the correspondences between antenna ports located in the first dimension in space and between antenna ports located in the second dimension in space.

In an embodiment, the configuration information is indicative of the following: the number K1 of CSI-RS antenna ports located in the first dimension in space, the number K2 of CSI-RS antenna ports located in the second dimension in space, the number N1 of antenna ports located in the first dimension in space onto which the precoding matrix is expected to be applied, and the number N2 of antenna ports located in the second dimension in space onto which the precoding matrix is expected to be applied; where K1, K2, N1 and N2 are all positive integers.

The correspondence between CSI-RS antenna ports and the antenna ports onto which the precoding matrix is expected to be applied is determined by K1, K2, N1 and N2.

The number of CSI-RS antenna ports is K, and the number of antenna ports onto which the precoding matrix is expected to be applied is N. K1, K2, N1 and N2 satisfy any of the following conditions #1 and 2.

$$K=2*K1*K2, \text{ and } N=2*N1*N2. \qquad \text{Condition \#1:}$$

For example, the correspondence between the CSI-RS antenna ports located in the first dimension in space and antenna ports located in the first dimension in space onto which the precoding matrix is expected to be applied can be determined according to K1 and N1, and the correspondence between the CSI-RS antenna ports located in the second dimension in space and antenna ports located in the second dimension in space onto which the precoding matrix is expected to be applied can be determined according to K2 and N2, so that the correspondence between CSI-RS antenna ports and antenna ports onto which the precoding matrix is expected to be applied can be determined according to K1, K2, N1, and N2. The number of CSI-RS antenna ports is K, and the number of antenna ports onto which the precoding matrix is expected to be applied is N, where K=2*K1*K2, and N=2*N1*N2.

For another example, the number of antenna ports located in the first dimension in space onto which the precoding matrix is expected to be applied, is N1, with the indices 0, 1, $\ldots$, N1−1. The number of CSI-RS antenna ports located in the first dimension in space is K1, with indices 0, 1, $\ldots$, K1−1. The antenna ports located in the first dimension in space onto which the precoding matrix is expected to be applied with the indices D1, D1+d1, D1+(K1−1) d1 correspond to the CSI-RS antenna ports located in the first dimension in space with indices 0, 1, $\ldots$, K1−1. d1=N1/K1, D1=0, 1, $\ldots$, d1−1, or D1 is a non-negative integer less than d1. In some examples, when D1=0, the antenna ports located in the first dimension in space onto which the precoding matrix is expected to be applied with indices 0, d1, $\ldots$, (K1−1) d1 correspond to the CSI-RS antenna ports located in the first dimension in space with the indices 0, 1, $\ldots$, K1−1.

The number of antenna ports located in the second dimension in space onto which the precoding matrix is expected to be applied, is N2, with the indices 0, 1, $\ldots$, N2−1. The number of CSI-RS antenna ports located in the second dimension in space is K2, with indices 0, 1, $\ldots$, K2−1. The antenna ports located in the second dimension in space onto which the precoding matrix is expected to be applied with the indices D2, D2+d2, $\ldots$, D2+(K2−1) d2 correspond to the CSI-RS antenna ports located in the second dimension in space with indices 0, 1, . . . , K2−1. d2=N2/K2, D2=0, 1, . . . , d2−1, or D2 is a non-negative integer less than d2. In some examples, when D2=0, the antenna ports located in the second dimension in space onto which the precoding matrix is expected to be applied with indices 0, d2, . . . , (K2−1) d2 correspond to the CSI-RS antenna ports located in the second dimension in space with the indices 0, 1, . . . , K2−1.

The number of CSI-RS antenna ports is K, and the number of antenna ports onto which the precoding matrix is expected to be applied is N, where K=2*K1*K2, and N=2*N1*N2. The numbers D1 or D2 can be designed in the protocol in advance or indicated in the configuration information.

$$K=2*(K1+K2), \text{ and } N=2*N1*N2. \qquad \text{Condition \#2:}$$

For example, the correspondence between the CSI-RS antenna ports located in the first dimension in space and antenna ports located in the first dimension in space onto which the precoding matrix is expected to be applied can be determined according to K1 and N1, and the correspondence between the CSI-RS antenna ports located in the second dimension in space and antenna ports located in the second dimension in space onto which the precoding matrix is expected to be applied can be determined according to K2 and N2, so that the correspondence between CSI-RS antenna ports and antenna ports onto which the precoding matrix is expected to be applied can be determined according to K1, K2, N1, and N2. The number of CSI-RS antenna ports is K, and the number of antenna ports onto which the precoding matrix is expected to be applied is N, where K=2*(K1+K2), and N=2*N1*N2.

For another example, the number of antenna ports located in the first dimension in space onto which the precoding matrix is expected to be applied, is N1, with the indices 0, 1, . . . , N1−1. The number of CSI-RS antenna ports located in the first dimension in space is K1, with indices 0, 1, . . . , K1−1. The antenna ports located in the first dimension in space onto which the precoding matrix is expected to be applied with the indices D1, D1+d1, . . . , D1+(K1−1) d1 correspond to the CSI-RS antenna ports located in the first dimension in space with indices 0, 1, . . . , K1−1. d1=N1/K1, D1=0, 1, . . . , d1−1, or D1 is a non-negative integer less than d1. In some examples, when D1=0, the antenna ports located in the first dimension in space onto which the precoding matrix is expected to be applied with indices 0, d1, . . . , (K1−1) d1 correspond to the CSI-RS antenna ports located in the first dimension in space with the indices 0, 1, . . . , K1−1.

The number of antenna ports located in the second dimension in space onto which the precoding matrix is expected to be applied, is N2, with the indices 0, 1, . . . , N2−1. The number of CSI-RS antenna ports located in the second dimension in space is K2, with indices 0, 1, . . . , K2−1. The antenna ports located in the second dimension in space onto which the precoding matrix is expected to be applied with the indices D2, D2+d2, . . . , D2+(K2−1) d2 correspond to the CSI-RS antenna ports located in the second dimension in space with indices 0, 1, . . . , K2−1. d2=N2/K2, D2=0, 1, . . . , d2−1, or D2 is a non-negative integer less than d2. In some examples, when D2=0, the antenna ports located in the second dimension in space onto which the precoding matrix is expected to be applied with indices 0, d2, . . . , (K2−1) d2 correspond to the CSI-RS antenna ports located in the second dimension in space with the indices 0, 1, . . . , K2−1.

The number of CSI-RS antenna ports is K, and the number of antenna ports onto which the precoding matrix is expected to be applied is N, where K=2*(K1+K2), and N=2*N1*N2. The numbers D1 or D2 can be designed in the protocol in advance or indicated in the configuration information.

FIG. 2 depicts a schematic flowchart showing another method for transmitting channel state information (CSI) according to an embodiment. As shown in FIG. 2, the method is applicable to a second communication node (such as a base station), and the method includes the following operations.

At S210, the second communication node sends configuration information to a first communication node.

The configuration information includes or consists of multiple parts. One part is the configuration information about channel state information reference signal (CSI-RS), and the other part is the configuration information about reporting the CSI.

At S220, the second communication node sends a channel state information reference signal, CSI-RS to the first communication node.

The CSI-RS is carried by a channel state information reference signal resource (CSI-RS Resource). The CSI-RS Resource is composed of a CDM group. And one CDM group is composed of radio resource elements, and CSI-RS of a group of CSI-RS antenna ports are multiplexed thereon by code division multiplexing.

At S230, the second communication node receives the CSI sent by the first communication node; the CSI includes a precoding matrix, and the configuration information is indicative of the number of CSI-RS antenna ports and the number of antenna ports onto which the precoding matrix is expected to be applied, and the number of CSI-RS antenna ports is smaller than the number of antenna ports onto which the precoding matrix is expected to be applied.

In an embodiment, the CSI may further include at least one of, a CQI that is indicative of the quality of a channel, or a PMI that is indicative of the precoding matrix applied to the antenna of the second communication node.

In the present disclosure, the first communication node is not expected to communicate with a fixed second communication node, but is expected to communicate with different second communication nodes. For example, during a period of time, a first communication node communicates with a second communication node A at a first location; while during another period of time, the first communication node communicates with a second communication node B at a second location. These second communication nodes may have different numbers of antenna ports (generally referred to as transmitting antenna ports).

When one of the second communication nodes has fewer antenna ports, each of the antenna ports transmits CSI-RS, so that the first communication node measures CSI-RS corresponding to a respective antenna port, obtains CSI corresponding to the respective antenna port, and feeds back the CSI corresponding to the respective antenna port. In this case, transmitting CSI-RS does not occupy too much overhead, and the feedback CSI corresponding to all antenna ports has high accuracy, so that efficient communication can be carried out by means of the transmitting antenna ports of the second communication node.

When some of the second communication nodes have more antenna ports, and in a case, each of the antenna ports transmits CSI-RS, so that the first communication node measures CSI-RS corresponding to a respective antenna port, obtains CSI corresponding to the respective antenna port, and feeds back the CSI corresponding to the respective antenna port. In this case, transmitting CSI-RS will occupy too much overhead, thus reducing the efficiency of communication by means of the transmitting antennas of the second communication node.

When some of these second communication nodes have a relatively large number of antenna ports, and in a case, the second communication nodes having a relatively large number of antenna ports only utilize part of the antenna ports to transmit CSI-RS, such that the first communication node measures the CSI-RS transmitted by the part of the antenna ports to obtain the CSI of the part of the antenna ports transmitting CSI-RS, and then estimates the CSI corresponding to all of the antenna ports through the CSI of these part of the antenna ports, and feeds back the CSI of all of the antenna ports. In this case, although the CSI corresponding to all of the antenna ports is estimated by the CSI of part of the antenna ports, with accuracy lost, but the overhead in transmitting CSI-RS is reduced, thus comprehensively improving the communication efficiency by means of the transmitting antennas of the second communication node.

Specifically, the antenna ports transmitting CSI-RS are the CSI-RS antenna ports; all of the transmit antenna ports are the antenna ports onto which the precoding matrix is expected to be applied.

The scheme set forth in the present disclosure can solve the problem resulting from the uncertainty in the number of transmitting antenna ports of a base station that a terminal device may connected to. The scheme facilitates the full utilization of the transmitting antenna ports of the base station having a relatively large number of transmitting antenna ports, to improve communication efficiency. The scheme provided by the present disclosure can also prevent the terminal device from misjudging (for example, the situation that all transmitting antenna ports transmit CSI-RS may be misjudged as the situation that part of the transmitting antenna ports transmit CSI-RS, thus feeding back incorrect CSI; for another example, the situation that part of the transmitting antenna ports transmit CSI-RS may be misjudged as the situation that all transmitting antenna ports transmit CSI-RS, thus feeding back the incorrect CSI).

In an embodiment, the configuration information is further indicative of the correspondence between the CSI-RS antenna port and the antenna port onto which the precoding matrix is expected to be applied.

For example, the configuration information indicates which part of the antenna ports onto which the precoding matrix is expected to be applied, serve as CSI-RS antenna ports.

For another example, the indices of the antenna ports onto which the precoding matrix is expected to be applied, are 0, 1, . . . , N−1. The indices of the CSI-RS antenna ports are 0, 1, . . . , K−1. The configuration information indicates which of the indices among 0, 1, . . . , N−1 of the antenna ports onto which the precoding matrix is expected to be applied, correspond to the indices 0, 1, . . . , K−1 of the CSI-RS antenna ports. In some examples, the configuration information indicates that the indices 0, 1, . . . , K−1 of the indices 0, 1, . . . , N−1 of the antenna ports on which the precoding matrix is expected to be applied, correspond to the indices 0, 1, . . . , K−1 of the CSI-RS antenna ports. Alternatively, the configuration information indicates that the indices N−K, N−K+1, . . . , N−1 of the indices 0, 1, . . . , N−1 of the antenna ports on which the precoding matrix is expected to be applied, correspond to the indices 0, 1, . . . , K−1 of the CSI-RS antenna ports. Alternatively, the configuration information indicates that the indices D, D+1, . . . , D+K−1 of the indices 0, 1, . . . , N−1 of the antenna ports on which the precoding matrix is expected to be applied, correspond to the indices 0, 1, . . . , K−1 of the CSI-RS antenna ports. Alternatively, the configuration information indicates that the indices D, D+d, . . . , D+(K−1)d of the indices 0, 1, . . . , N−1 of the antenna ports on which the precoding matrix is expected to be applied, correspond to the indices 0, 1, . . . , K−1 of the CSI-RS antenna ports.

For another example, the antenna ports on which the precoding matrix is expected to be applied are grouped into M group, each group includes K antenna ports, and the configuration information indicates that the antenna ports of one of the M groups serve as CSI-RS antenna ports.

N, K, d and M discussed above are all positive integers, while D is a non-negative integer.

The configuration information is indicative of the correspondence between the CSI-RS antenna port and the antenna port onto which the precoding matrix is expected to be applied, which is beneficial for the terminal device to estimate the CSI corresponding to the antenna port onto which the precoding matrix is expected to be applied according to the channel state information measured from the CSI-RS antenna port. For example, the channel coefficient corresponding to the antenna ports onto which the precoding matrix is expected to be applied, is estimated from the channel coefficient measured on the CSI-RS antenna ports, thereby estimating the precoding matrix corresponding to the antenna port onto which the precoding matrix is expected to be applied. As such, the accuracy of the channel state information and thus the performance are improved, and the complexity of the coefficient is reduced.

In an embodiment, the correspondence between the CSI-RS antenna port and the antenna port onto which the precoding matrix is expected to be applied is indicated by any one of the following schemes #1-3.

Scheme #1: The correspondence between CSI-RS antenna ports and antenna ports onto which the precoding matrix is expected to be applied, is indicated by a bitmap, where a bit in the bitmap indicates an antenna port onto which the precoding matrix is expected to be applied, and a specific bit in the bitmaps indicate a CSI-RS antenna port.

In some examples, the specific bit is a non-zero bit.

For example, the number of antenna ports onto which the precoding matrix is expected to be applied is N, and the number of bits in the bit map is N. Each of the bits in the bit map corresponds to a respective one of the antenna ports onto which the precoding matrix is expected to be applied, and non-zero bits in the bit map indicate the CSI-RS antenna ports.

For another example, the number of antenna ports onto which the precoding matrix is expected to be applied is N, the number of CSI-RS antenna ports is K, and the number of bits in the bit map is M. One bit in the bit map corresponds to K antenna ports onto which the precoding matrix is expected to be applied, and the non-zero bit in the bit map indicates the CSI-RS antenna ports. That is, a non-zero bit in the bit map indicates K CSI-RS antenna ports.

For another example, the number of antenna ports onto which the precoding matrix is expected to be applied is N, the number of CSI-RS antenna ports is K, and the number of bits in the bit map is M. One bit in the bit map corresponds to W antenna ports onto which the precoding matrix is expected to be applied, and the non-zero bits in the bit map indicate the CSI-RS antenna ports. That is, all non-zero bits in the bit map indicate K CSI-RS antenna ports, and W is an integer less than K and greater than 1.

Scheme #2: The correspondence between CSI-RS antenna ports and antenna ports onto which the pre-coding matrix is expected to be applied, is indicated by one integer, and the integer indicates the part of the antenna ports served as CSI-RS antenna ports among the antenna ports onto which the precoding matrix is expected to be applied.

For example, the number of antenna ports onto which the precoding matrix is expected to be applied is N, and the number of CSI-RS antenna ports is K. The antenna ports onto which the precoding matrix is expected to be applied, are grouped into M groups. Each group includes K CSI-RS antenna ports, and corresponds to an index or an integer. A group of antenna ports corresponding to an integer is indi-cated by the integer, as the CSI-RS antenna ports. Alterna-tively, a group of antenna ports corresponding to an index is indicated by the index, as the CSI-RS antenna ports.

Scheme #3: One correspondence is selected from at least one preset correspondence as the correspondence between the CSI-RS antenna ports and the antenna ports onto which the precoding matrix is expected to be applied.

For example, M preset correspondences are provided between the CSI-RS antenna ports and the antenna ports onto which the precoding matrix is expected to be applied, and one of the M preset correspondences is selected as the correspondence between the CSI-RS antenna ports and the antenna ports onto which the precoding matrix is expected to be applied.

For another example, the number M of the preset corre-spondences between the CSI-RS antenna ports and the antenna ports onto which the precoding matrix is expected to be applied is determined according to the number K of the CSI-RS antenna ports. Corresponding to one number of CSI-RS antenna ports, one correspondence is selected as the correspondence between the CSI-RS antenna ports and the antenna ports onto which the precoding matrix is expected to be applied, from the preset correspondences between the CSI-RS antenna ports and the antenna ports onto which the precoding matrix is expected to be applied.

N, K, M and W as discussed above are all positive integers.

In an embodiment, the correspondence between CSI-RS antenna ports and antenna ports onto which the precoding matrix is expected to be applied, is determined by the number of antenna ports onto which the precoding matrix is expected to be applied and the number of CSI-RS antenna ports.

For example, the number of antenna ports onto which the precoding matrix is expected to be applied is N, with the indices being $0, 1, \ldots, N-1$. The number of CSI-RS antenna ports is K, with the indices being $0, 1, \ldots, K-1$. The antenna ports onto which the precoding matrix is expected to be applied with the indices $D, D+d, \ldots, D+(K-1)d$ correspond to the CSI-RS antenna ports with indices $0, 1, \ldots, K-1$. $d=N/K$, $D=0, 1, \ldots, d-1$, or D is a non-negative integer less than d. In some examples, when $D=0$, the antenna ports onto which the precoding matrix is expected to be applied with indices $0, d, \ldots, (K-1)d$ correspond to the CSI-RS antenna ports with the indices $0, 1, \ldots, K-1$.

For another example, the number of antenna ports onto which the precoding matrix is expected to be applied is N, with the indices being $0, 1, \ldots, N-1$. The number of CSI-RS antenna ports is K, with the indices being $0, 1, \ldots, K-1$. The antenna ports onto which the precoding matrix is expected to be applied with the indices $\{D, D+1, \ldots, D+Q-1\}, \{D+d, D+d+1, \ldots, D+d+Q-1\}, \ldots, \{D+(K/Q-1)d, D+(K/Q-1)d+1, \ldots, D+(K/Q-1)d+Q-1\}$ correspond to the CSI-RS antenna ports with indices $0, 1, \ldots, K-1$. Q is a positive integer less than K, $d=QN/K$, $D=0, 1, \ldots, d-Q$, or D is a non-negative integer less than $d-Q$. In some examples, when $D=0$, the antenna ports onto which the precoding matrix is expected to be applied with indices $\{0, 1, \ldots, Q-1\}, \{d, d+1, \ldots, d+Q-1\}, \ldots, \{(K/Q-1)d, (K/Q-1)d+1, \ldots, (K/Q-1)d+Q-1\}$ correspond to the CSI-RS antenna ports with the indices $0, 1, \ldots, K-1$.

N and K discussed above are positive integers.

In an embodiment, the number of antenna ports onto which the precoding matrix is expected to be applied is P times the number of CSI-RS antenna ports, where P is an integer greater than 1.

For example, the value of P can be 2, 3, 4, or 5; and can also be 2k, where k is a positive integer.

In an embodiment, the configuration information is fur-ther indicative of, the correspondence between the CSI-RS antenna ports located in the first dimension in space and the antenna ports located in the first dimension in space onto which the precoding matrix is expected to be applied, and the correspondence between the CSI-RS antenna ports located in second dimension in space and the antenna ports located in the second dimension in space onto which the precoding matrix is expected to be applied.

For example, the configuration information indicates which part of the antenna ports located in the first dimension in space onto which the precoding matrix is expected to be applied serve as the CSI-RS antenna ports located in the first dimension in space; and indicates which part of the antenna ports located in the second dimension in space onto which the precoding matrix is expected to be applied, are served as the CSI-RS antenna ports located in the second dimension in space. As such, the correspondence between CSI-RS antenna ports and the transmitting antenna ports onto which the precoding matrix is expected to be applied, can be obtained according to the correspondences between antenna ports located in the first dimension in space and between antenna ports located in the second dimension of space.

In an embodiment, the configuration information is indicative of the following: the number K1 of CSI-RS antenna ports located in the first dimension in space, the number K2 of CSI-RS antenna ports located in the second dimension in space, the number N1 of antenna ports located in the first dimension in space onto which the precoding matrix is expected to be applied, and the number N2 of antenna ports located in the second dimension in space onto which the precoding matrix is expected to be applied; where K1, K2, N1 and N2 are all positive integers.

The correspondence between CSI-RS antenna ports and the antenna ports onto which the precoding matrix is expected to be applied is determined by K1, K2, N1 and N2.

The number of CSI-RS antenna ports is K, and the number of antenna ports onto which the precoding matrix is expected to be applied is N. K1, K2, N1 and N2 satisfy any of the following conditions #1 and 2.

Condition #1: $K=2*K1*K2$, and $N=2*N1*N2$.

For example, the correspondence between the CSI-RS antenna ports located in the first dimension in space and antenna ports located in the first dimension in space onto which the precoding matrix is expected to be applied can be determined according to K1 and N1, and the correspondence between the CSI-RS antenna ports located in the second dimension in space and antenna ports located in the second dimension in space onto which the precoding matrix is expected to be applied can be determined according to K2 and N2, so that the correspondence between CSI-RS antenna ports and antenna ports onto which the precoding matrix is expected to be applied can be determined according to K1, K2, N1, and N2. The number of CSI-RS antenna ports is K, and the number of antenna ports onto which the precoding matrix is expected to be applied is N, where K=2*K1*K2, and N=2*N1*N2.

For another example, the number of antenna ports located in the first dimension in space onto which the precoding matrix is expected to be applied, is N1, with the indices 0, 1, . . . . N1−1. The number of CSI-RS antenna ports located in the first dimension in space is K1, with indices 0, 1, . . . , K1−1. The antenna ports located in the first dimension in space onto which the precoding matrix is expected to be applied with the indices D1, D1+d1, . . . , D1+(K1−1) d1 correspond to the CSI-RS antenna ports located in the first dimension in space with indices 0, 1, . . . , K1−1. d1=N1/K1, D1=0, 1, . . . , d1−1, or D1 is a non-negative integer less than d1. In some examples, when D1=0, the antenna ports located in the first dimension in space onto which the precoding matrix is expected to be applied with indices 0, d1, . . . , (K1−1) d1 correspond to the CSI-RS antenna ports located in the first dimension in space with the indices 0, 1, . . . , K1−1.

The number of antenna ports located in the second dimension in space onto which the precoding matrix is expected to be applied, is N2, with the indices 0, 1, . . . , N2−1. The number of CSI-RS antenna ports located in the second dimension in space is K2, with indices 0, 1, . . . , K2−1. The antenna ports located in the second dimension in space onto which the precoding matrix is expected to be applied with the indices D2, D2+d2, . . . , D2+(K2−1) d2 correspond to the CSI-RS antenna ports located in the second dimension in space with indices 0, 1, . . . , K2−1. d2=N2/K2, D2=0, 1, . . . , d2−1, or D2 is a non-negative integer less than d2. In some examples, when D2=0, the antenna ports located in the second dimension in space onto which the precoding matrix is expected to be applied with indices 0, d2, . . . , (K2−1) d2 correspond to the CSI-RS antenna ports located in the second dimension in space with the indices 0, 1, . . . , K2−1.

The number of CSI-RS antenna ports is K, and the number of antenna ports onto which the precoding matrix is expected to be applied is N, where K=2*K1*K2, and N=2*N1*N2. The numbers D1 or D2 can be designed in the protocol in advance or indicated in the configuration information.

$$K=2*(K1+K2), \text{ and } N=2*N1*N2. \qquad \text{Condition \#2:}$$

For example, the correspondence between the CSI-RS antenna ports located in the first dimension in space and antenna ports located in the first dimension in space onto which the precoding matrix is expected to be applied can be determined according to K1 and N1, and the correspondence between the CSI-RS antenna ports located in the second dimension in space and antenna ports located in the second dimension in space onto which the precoding matrix is expected to be applied can be determined according to K2 and N2, so that the correspondence between CSI-RS antenna ports and antenna ports onto which the precoding matrix is expected to be applied can be determined according to K1, K2, N1, and N2. The number of CSI-RS antenna ports is K, and the number of antenna ports onto which the precoding matrix is expected to be applied is N, where K=2*(K1+K2), and N=2*N1*N2.

For another example, the number of antenna ports located in the first dimension in space onto which the precoding matrix is expected to be applied, is N1, with the indices 0, 1, . . . , N1−1. The number of CSI-RS antenna ports located in the first dimension in space is K1, with indices 0, 1, . . . , K1−1. The antenna ports located in the first dimension in space onto which the precoding matrix is expected to be applied with the indices D1, D1+d1, . . . , D1+(K1−1) d1 correspond to the CSI-RS antenna ports located in the first dimension in space with indices 0, 1, . . . , K1−1. d1=N1/K1, D1=0, 1, . . . , d1−1, or D1 is a non-negative integer less than d1. In some examples, when D1=0, the antenna ports located in the first dimension in space onto which the precoding matrix is expected to be applied with indices 0, d1, . . . , (K1−1) d1 correspond to the CSI-RS antenna ports located in the first dimension in space with the indices 0, 1, . . . , K1−1.

The number of antenna ports located in the second dimension in space onto which the precoding matrix is expected to be applied, is N2, with the indices 0, 1, . . . , N2−1. The number of CSI-RS antenna ports located in the second dimension in space is K2, with indices 0, 1, . . . , K2−1. The antenna ports located in the second dimension in space onto which the precoding matrix is expected to be applied with the indices D2, D2+d2, . . . , D2+(K2−1) d2 correspond to the CSI-RS antenna ports located in the second dimension in space with indices 0, 1, . . . , K2−1. d2=N2/K2, D2=0, 1, . . . , d2−1, or D2 is a non-negative integer less than d2. In some examples, when D2=0, the antenna ports located in the second dimension in space onto which the precoding matrix is expected to be applied with indices 0, d2, . . . , (K2−1) d2 correspond to the CSI-RS antenna ports located in the second dimension in space with the indices 0, 1, . . . , K2−1.

The number of CSI-RS antenna ports is K, and the number of antenna ports onto which the precoding matrix is expected to be applied is N, where K=2*(K1+K2), and N=2*N1*N2. The numbers D1 or D2 can be designed in the protocol in advance or indicated in the configuration information.

An embodiment of the present disclosure provides a method for transmitting channel state information (CSI), the method includes, receiving configuration information sent by a second communication node; receiving a channel state information reference signal (CSI-RS) sent by the second communication node according to the configuration information; measuring the CSI-RS to obtain channel state information (CSI), and transmitting the CSI to the second communication node; where the CSI includes a precoding matrix, and the configuration information is indicative of a number of CSI-RS antenna ports and a number of antenna ports onto which the precoding matrix is expected to be applied; and the number of CSI-RS antenna ports is smaller than the number of antenna ports onto which the precoding matrix is expected to be applied. The present disclosure can improve the communication efficiency between the terminal device and the base station having a large number of antenna ports.

FIG. 3 depicts a schematic diagram showing a device for transmitting CSI according to an embodiment of the present disclosure. The device can be arranged within a first communication node. As shown in FIG. 3, the device includes a receiving module 10, a processing module 11, and a transmitting module 12.

The receiving module 10 is configured to receive configuration information sent by a second communication node; and to receive the channel state information reference signal (CSI-RS) sent by the second communication node, according to the configuration information.

The processing module 11 is configured to measure the CSI-RS and obtain CSI.

The transmitting module 12 is configured to transmit CSI to the second communication node; the CSI includes a precoding matrix, and the configuration information is indicative of the number of CSI-RS antenna ports and the number of antenna ports onto which the precoding matrix is expected to be applied, and the number of CSI-RS antenna ports is smaller than the number of antenna ports onto which the precoding matrix is expected to be applied.

The device for transmitting CSI according to this embodiment is configured to carry out the method for transmitting CSI in the embodiment shown in FIG. 1, with a similar scheme and technical effects, and which will not be repeated here.

In an embodiment, the configuration information is further indicative of the correspondence between the CSI-RS antenna port and the antenna port onto which the precoding matrix is expected to be applied.

In an embodiment, the correspondence between the CSI-RS antenna port and the antenna port onto which the precoding matrix is expected to be applied is indicated by any one of the following schemes.

In a scheme, the correspondence between the CSI-RS antenna ports and the antenna ports onto which the precoding matrix is expected to be applied is indicated by a bitmap, and the bits in the bitmap indicate the antenna ports onto which the precoding matrix is expected to be applied, and the specific bits in the bitmap indicate the CSI-RS antenna ports. In another scheme, the correspondence between the CSI-RS antenna ports and the antenna ports onto which the precoding matrix is expected to be applied is indicated by an integer, and the integer indicates which part of the antenna ports onto which the precoding matrix is expected to be applied, are served as the CSI-RS antenna ports. In yet another scheme, one correspondence is selected from at least one preset correspondence as the correspondence between the CSI-RS antenna ports and the antenna ports onto which the precoding matrix is expected to be applied.

In an embodiment, the specific bit is a non-zero bit.

In an embodiment, the correspondence between CSI-RS antenna ports and antenna ports onto which the precoding matrix is expected to be applied, is determined by the number of antenna ports onto which the precoding matrix is expected to be applied and the number of CSI-RS antenna ports.

In an embodiment, the number of antenna ports onto which the precoding matrix is expected to be applied is P times the number of CSI-RS antenna ports, where P is an integer greater than 1.

In an embodiment, the configuration information is further indicative of, the correspondence between the CSI-RS antenna ports located in the first dimension in space and the antenna ports located in the first dimension in space onto which the precoding matrix is expected to be applied, and the correspondence between the CSI-RS antenna ports located in second dimension in space and the antenna ports located in the second dimension in space onto which the precoding matrix is expected to be applied.

In an embodiment, the configuration information is indicative of the following: the number K1 of CSI-RS antenna ports located in the first dimension in space, the number K2 of CSI-RS antenna ports located in the second dimension in space, the number N1 of antenna ports located in the first dimension in space onto which the precoding matrix is expected to be applied, and the number N2 of antenna ports located in the second dimension in space onto which the precoding matrix is expected to be applied; where K1, K2, N1 and N2 are all positive integers.

In an embodiment, the correspondence between CSI-RS antenna ports and the antenna ports onto which the precoding matrix is expected to be applied is determined by K1, K2, N1 and N2.

In an embodiment, the number of CSI-RS antenna ports is K, and the number of antenna ports onto which the precoding matrix is expected to be applied is N; where K1, K2, N1, and N2 satisfy any of the following conditions: $K=2*K1*K2$, $N=2*N1*N2$; or $K=2*(K1+K2)$, and $N=2*N1*N2$.

Figure 4:
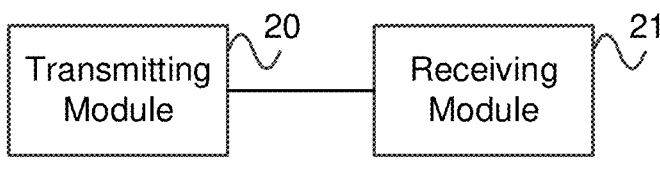
FIG. 4 depicts a schematic diagram showing another device for transmitting CSI according to an embodiment of the present disclosure.

FIG. 4 depicts a schematic diagram showing another device for transmitting CSI according to an embodiment of the present disclosure. The device can be arranged within a second communication node. As shown in FIG. 4, the device includes a transmitting module 20, and a receiving module 21.

The transmitting module 20 is configured to transmit configuration information to a first communication node; and to transmit a channel state information reference signal, CSI-RS to the first communication node.

The receiving module 21 is configured to receive the CSI send by the first communication node; where the CSI includes a precoding matrix, and the configuration information is indicative of the number of CSI-RS antenna ports and the number of antenna ports onto which the precoding matrix is expected to be applied, and the number of CSI-RS antenna ports is smaller than the number of antenna ports onto which the precoding matrix is expected to be applied.

The device for transmitting CSI according to this embodiment is configured to carry out the method for transmitting CSI in the embodiment shown in FIG. 2, with a similar scheme and technical effects, and which will not be repeated here.

In an embodiment, the configuration information is further indicative of the correspondence between the CSI-RS antenna port and the antenna port onto which the precoding matrix is expected to be applied.

In an embodiment, the correspondence between the CSI-RS antenna port and the antenna port onto which the precoding matrix is expected to be applied is indicated by any one of the following schemes. In a scheme, the correspondence between the CSI-RS antenna ports and the antenna ports onto which the precoding matrix is expected to be applied is indicated by a bitmap, and the bits in the bitmap indicate the antenna ports onto which the precoding matrix is expected to be applied, and the specific bits in the bitmap indicate the CSI-RS antenna ports. In another scheme, the correspondence between the CSI-RS antenna ports and the antenna ports onto which the precoding matrix is expected to be applied is indicated by an integer, and the integer indicates which part of the antenna ports onto which the precoding matrix is expected to be applied, are served as the CSI-RS antenna ports. In yet another scheme, one correspondence is selected from at least one preset correspondence as the correspondence between the CSI-RS antenna ports and the antenna ports onto which the precoding matrix is expected to be applied.

In an embodiment, the specific bit is a non-zero bit.

In an embodiment, the correspondence between CSI-RS antenna ports and antenna ports onto which the precoding matrix is expected to be applied, is determined by the number of antenna ports onto which the precoding matrix is expected to be applied and the number of CSI-RS antenna ports.

In an embodiment, the number of antenna ports onto which the precoding matrix is expected to be applied is P times the number of CSI-RS antenna ports, where P is an integer greater than 1.

In an embodiment, the configuration information is further indicative of, the correspondence between the CSI-RS antenna ports located in the first dimension in space and the antenna ports located in the first dimension in space onto which the precoding matrix is expected to be applied, and the correspondence between the CSI-RS antenna ports located in second dimension in space and the antenna ports located in the second dimension in space onto which the precoding matrix is expected to be applied.

In an embodiment, the configuration information is indicative of the following: the number K1 of CSI-RS antenna ports located in the first dimension in space, the number K2 of CSI-RS antenna ports located in the second dimension in space, the number N1 of antenna ports located in the first dimension in space onto which the precoding matrix is expected to be applied, and the number N2 of antenna ports located in the second dimension in space onto which the precoding matrix is expected to be applied; where K1, K2, N1 and N2 are all positive integers.

In an embodiment, the correspondence between CSI-RS antenna ports and the antenna ports onto which the precoding matrix is expected to be applied is determined by K1, K2, N1 and N2.

In an embodiment, the number of CSI-RS antenna ports is K, and the number of antenna ports onto which the precoding matrix is expected to be applied is N; where K1, K2, N1, and N2 satisfy any of the following conditions: $K=2*K1*K2$, $N=2*N1*N2$; or $K=2*(K1+K2)$, and $N=2*N1*N2$.

An embodiment of the present disclosure provides a communication node, which includes a processor configured to carry out the method according to any one of the embodiments of the present disclosure when executing a computer program. The communication node may be the first communication node (such as UE) according to any one of the embodiments of the present disclosure, or the second communication node (such as a base station) according to any one of the embodiments of the present disclosure, and the present disclosure is not limited thereto.

The following embodiments respectively provide a schematic diagram of a base station or a UE as the communication node.

Figure 5:
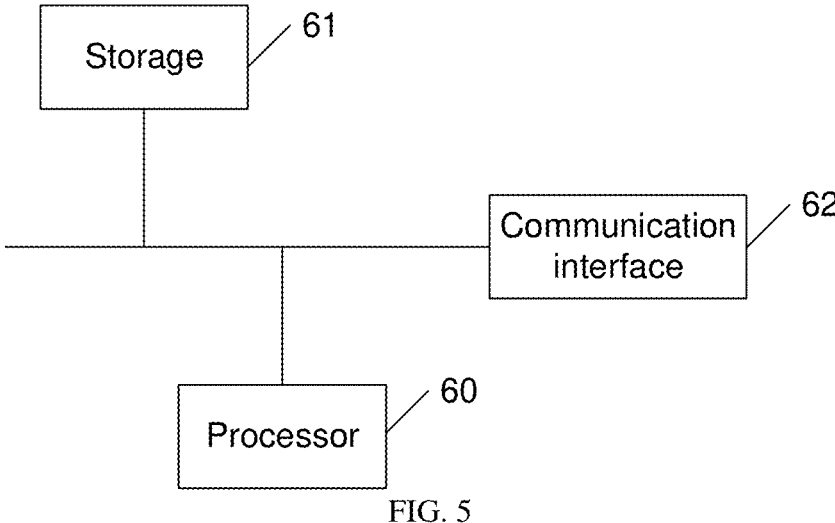
FIG. 5 depicts a schematic diagram showing a base station according to an embodiment of the present disclosure.

FIG. 5 depicts a schematic diagram showing a base station according to an embodiment. As shown in FIG. 5, the base station includes a processor 60, a memory 61, and a communication interface 62. One or more processors 60 can be provided in the base station, and FIG. 5 shows one processor 60 by way of an example. The processor 60 and the memory 61, the communication interface 62 in the base station can be connected by a bus or the like, and FIG. 5 shows the connection via the bus by way of an example. Bus refers to one or more of several bus structures, including a memory bus or memory controller, a peripheral bus, graphics acceleration port, processor, or local bus utilizing any of several bus structures.

As a computer-readable storage medium, the memory 61 can be configured to store software programs, computer-executable programs, and modules, such as program instructions/modules corresponding to the method described in any one of the embodiments of the present disclosure. The software programs, instructions, and modules stored in the memory 61, when executed by the processor 60, cause the processor 60 to perform various functional applications and data processing of the base station, to carry out any one of the above-mentioned methods.

The memory 61 may include a program storage section and a data storage section, in which the program storage section may store an operating system and application programs for performing at least one operation, and the data storage section may store data created according to the operation of the terminal device, or the like. In addition, the memory 61 can include high-speed random access memory and nonvolatile memory, such as at least one disk memory device, a flash memory device, or other nonvolatile solid-state memory devices. In some implementations, the memory 61 may include memory remotely arranged with respect to the processor 60, and the remote memory may be connected to the base station through a network. Examples of the above networks include, but are not limited to, the Internet, enterprise intranet, network, mobile communication network, and combinations thereof.

The communication interface 62 can be configured to receive and send data.

Figure 6:
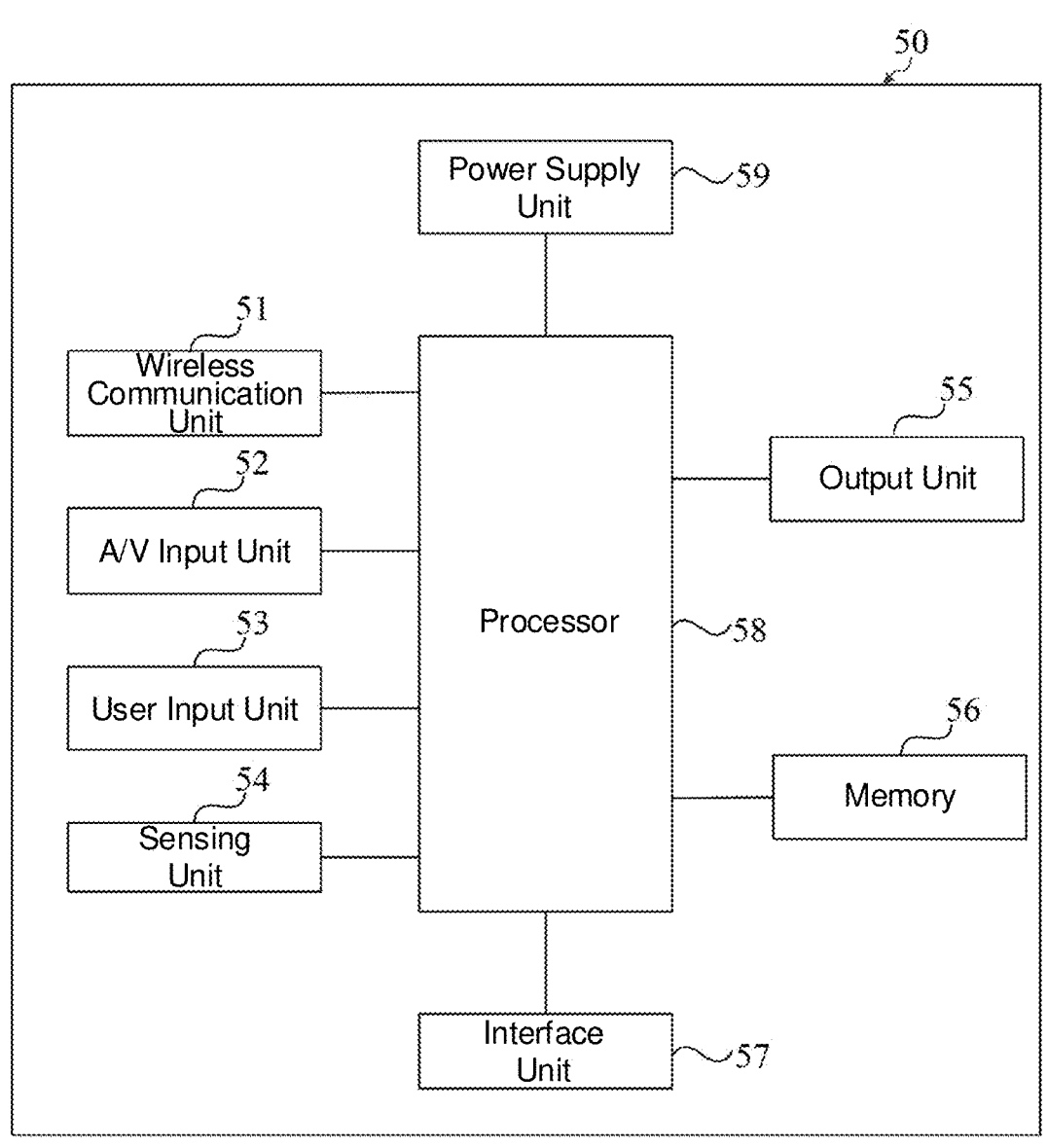
FIG. 6 depicts a schematic diagram showing a UE according to an embodiment of the present disclosure.

FIG. 6 depicts a schematic diagram showing a UE according to an embodiment of the present disclosure. The UE may be implemented in various forms, and the UE in the present disclosure may include but is not limited to, mobile terminal devices such as a cell phone, a smart phone, a laptop computer, a digital broadcasting receiver, a personal digital assistant (PDA), a portable computer (PAD), a portable multimedia player (PMP), a navigation device, an in-vehicle terminal device, an in-vehicle display terminal, an in-vehicle electronic rearview mirror, and so on, as well as fixed terminal devices such as a digital television (TV), a desktop computer, or the like.

As shown in FIG. 6, the UE 50 may include a wireless communication unit 51, an Audio/Video (A/V) input unit 52, a user input unit 53, a sensing unit 54, an output unit 55, a memory 56, an interface unit 57, a processor 58, a power supply unit 59, and the like. FIG. 6 shows a UE including various components, but it should be understood that not all the components shown are necessary. Alternatively, more or fewer components may be included.

In this embodiment, the wireless communication unit 51 allows radio communication between the UE 50 and a base station or a network. The A/V input unit 52 is configured to receive audio or video signals. The user input unit 53 may generate key input data according to commands input by the user to control various operations of the UE 50. The sensing unit 54 detects the current state of the UE 50, the position of the UE 50, the presence or absence of a user's touch input to the UE 50, the orientation of the UE 50, the acceleration or deceleration movement and direction of the UE 50, and the like, and generates a command or signal for controlling the operation of the UE 50. The interface unit 57 serves as an interface through which at least one external device can connect with the UE 50. The output unit 55 is configured to provide an output visual, audio and/or tactile signals. The memory 56 may store software programs for processing and control operations performed by the processor 58, etc., or may temporarily store data that has been or to be output. The memory 56 may include storage medium of at least one type. Moreover, the UE 50 may cooperate with a network storage device that performs the storage function of the memory 56 through a network connection. The processor 58 generally controls the overall operation of the UE 50. The power supply unit 59 receives external power or internal power under the control of the processor 58 and provides appropriate power required for operating various elements and components.

The processor 58 executes at least one functional application and data processing by running the program stored in the memory 56, for example, to carry out the method according to any one of the embodiments of the present disclosure.

An embodiment of the present disclosure provides a computer-readable storage medium storing a computer program which, when executed by a processor, causes the processor to carry out the method described in any one embodiment of the present disclosure.

The computer storage medium in an embodiment of the present disclosure can take the form of any combination of one or more computer-readable medium. The computer-readable medium can be a computer-readable signal medium or a computer-readable storage medium. The computer readable storage media can be, for example, but is not limited to: systems, apparatus, or devices of electricity, magnetism, optical, electromagnetism, infrared, or semiconductors, or any combination of the above. Computer-readable storage media (non exhaustive list) include: electrical connections with one or more wires, portable computer disks, hard drives, Random Access Memory (RAM), Read Only Memory (ROM), Erasable Programmable Read Only Memory (EPROM), flash memory, fiber optic, portable compact disc Read-Only Memory (CD-ROM), optical storage devices, magnetic storage devices, or any suitable combination of the above. In the present disclosure, the computer-readable storage medium can be any tangible medium that contains or stores a program, which can be used by or in combination with an instruction execution system, apparatus, or device.

The computer readable signal medium can include data signals propagated in the baseband or as part of the carrier wave, which carry computer readable program code. This type of transmitted data signal can take various forms, including but not limited to electromagnetic signals, optical signals, or any suitable combination of the above. The computer-readable signal medium can also be any computer-readable medium other than a computer-readable storage medium, which can send, propagate, or transmit programs used by or in combination with instruction execution systems, apparatus, or devices.

The program code contained on computer readable media can be transmitted using any suitable medium, including but not limited to: wireless, wire, optical cable, Radio Frequency (RF), etc., or any suitable combination of the above.

Computer program code for executing the operations of the present disclosure may be written in one or more programming languages or combinations thereof, including object-oriented programming languages such as Java, Smalltalk, C++, Ruby, or Go, and conventional procedural programming languages such as "C" or similar programming languages. Program code can be completely executed on the user's computer, partially executed on the user's computer, executed as a standalone software package, partially executed on the user's computer, partially executed on a remote computer, or completely executed on a remote computer or server. In terms of remote computers, remote computers can connect to user computers through any type of network, including a local area network (LAN) or wide area network (WAN) or can connect to external computers (such as utilizing an Internet service provider to connect through the Internet).

It should be understood by those having ordinary skills in the art that the term user equipment covers any suitable type of wireless user equipment, such as a mobile phone, a portable data processing device, a portable web browser, or a vehicle-mounted mobile station.

Generally, various embodiments of the present disclosure may be implemented as hardware or dedicated circuits, software, logic or any suitable combination thereof. For example, some aspects may be implemented as hardware, while other aspects may be implemented as firmware or software executable by a controller, microprocessor or other computing device, although the present disclosure is not limited thereto.

Some embodiments of the present disclosure can be implemented by a data processor of a mobile device executing computer program instructions, for example, in a processor entity, or by hardware, or by a combination of software and hardware. Computer program instructions can be assembly instructions, instruction set architecture (ISA) instructions, machine instructions, machine-related instructions, microcode, firmware instructions, state setting data, or source code or object code written in any combination of one or more programming languages.

The block diagram of any logic flow in the drawings of the present disclosure may represent program process, or may represent interconnected logic circuits, modules and functions, or may represent the combination of program process and logic circuits, modules and functions. Computer programs can be stored in the memory. The memory can be of any type suitable for the local technical environment and can be realized with any suitable data storage technology, such as, but not limited to, read-only memory (ROM), random access memory (RAM), optical memory devices and systems (digital versatile disc (DVD) or CD disc), etc. Computer-readable media may include non-transitory storage media. The data processor can be of any type suitable for the local technical environment, such as but not limited to a general-purpose computer, a special-purpose computer, a microprocessor, a digital signal processor (DSP), an application-specific integrated circuit (ASIC), a field-programmable gate array (FGPA) and a processor based on a multi-core processor architecture.

What is claimed is:

1. A method for transmitting channel state information (CSI), which is applied to a first communication node, the method comprising,
  receiving configuration information sent by a second communication node;
  receiving a channel state information reference signal (CSI-RS) sent by the second communication node according to the configuration information;
  measuring the CSI-RS to obtain the CSI, and transmitting the CSI to the second communication node; wherein the CSI comprises a precoding matrix; the configuration information is indicative of a number of CSI-RS antenna ports and a number of antenna ports onto which the precoding matrix is expected to be applied; and the number of CSI-RS antenna ports is smaller than the number of antenna ports onto which the precoding matrix is expected to be applied.

2. The method as claimed in claim 1, wherein the configuration information is further indicative of a correspondence between the CSI-RS antenna ports and the antenna ports onto which the precoding matrix is expected to be applied.

3. The method as claimed in claim 2, wherein the correspondence between the CSI-RS antenna ports and the antenna ports onto which the precoding matrix is expected to be applied, is indicated by one of following schemes in which, the correspondence between the CSI-RS antenna ports and the antenna ports onto which the precoding matrix is expected to be applied, is indicated by a bitmap, and a bit in the bitmap indicates an antenna port onto which the precoding matrix is expected to be applied, and a specific bit in the bitmaps indicates a CSI-RS antenna port;

the correspondence between the CSI-RS antenna ports and the antenna ports onto which the precoding matrix is expected to be applied, is indicated by one integer, and the integer indicates a part of the antenna ports served as the CSI-RS antenna ports among the antenna ports onto which the precoding matrix is expected to be applied; or one correspondence is selected from at least one preset correspondence as the correspondence between the CSI-RS antenna ports and the antenna ports onto which the precoding matrix is expected to be applied.

4. The method as claimed in claim 3, wherein the specific bit is a non-zero bit.

5. The method according to claim 2, wherein the correspondence between the CSI-RS antenna ports and the antenna ports onto which the precoding matrix is expected to be applied, is determined by the number of antenna ports onto which the precoding matrix is expected to be applied and the number of the CSI-RS antenna ports.

6. The method as claimed in claim 1, wherein the configuration information is further indicative of, a correspondence between the CSI-RS antenna ports located in a first dimension in space and the antenna ports located in the first dimension in space onto which the precoding matrix is expected to be applied, and the correspondence between the CSI-RS antenna ports located in a second dimension in space and the antenna ports located in the second dimension in space onto which the precoding matrix is expected to be applied.

7. The method according to claim 2, wherein the configuration information is indicative of: the number K1 of CSI-RS antenna ports located in a first dimension in space, the number K2 of CSI-RS antenna ports located in a second dimension in space, the number N1 of antenna ports located in the first dimension in space onto which the precoding matrix is expected to be applied, and the number N2 of antenna ports located in the second dimension in space onto which the precoding matrix is expected to be applied; wherein each of K1, K2, N1 and N2 is a positive integer.

8. The method as claimed in claim 7, wherein the correspondence between the CSI-RS antenna ports and the antenna ports onto which the precoding matrix is expected to be applied is determined by K1, K2, N1, and N2.

9. The method as claimed in claim 7, wherein the number of CSI-RS antenna ports is K, and the number of antenna ports onto which precoding matrix is expected to be applied is N; and K1, K2, N1 and N2 satisfy either of, $$K=2*K1*K2, \text{ and } N=2*N1*N2; \text{ or}$$

$$K=2*(K1+K2), \text{ and } N=2*N1*N2.$$

10. A communication node, comprising, a processor; wherein the processor is configured to carry out the method as claimed in claim 1, when executing a computer program.

11. A non-transitory computer-readable storage medium storing a computer program which, when executed by a processor, causes the processor to carry out the method as claimed in claim 1.

12. A method for transmitting channel state information (CSI), which is applied to a second communication node, the method comprising, transmitting configuration information to a first communication node;

transmitting a channel state information reference signal (CSI-RS) to the first communication node; and receiving the CSI sent by the first communication node; wherein the CSI comprises a precoding matrix; the configuration information is indicative of a number of CSI-RS antenna ports and a number of antenna ports onto which the precoding matrix is expected to be applied, and the number of the CSI-RS antenna ports is smaller than the number of antenna ports onto which the precoding matrix is expected to be applied.

13. The method as claimed in claim 12, wherein the configuration information is further indicative of a correspondence between the CSI-RS antenna ports and the antenna ports onto which the precoding matrix is expected to be applied.

14. The method as claimed in claim 13, wherein the correspondence between the CSI-RS antenna ports and the antenna ports onto which the precoding matrix is expected to be applied, is indicated by one of following schemes in which, the correspondence between the CSI-RS antenna ports and the antenna ports onto which the precoding matrix is expected to be applied, is indicated by a bitmap, and a bit in the bitmap indicates an antenna port onto which the precoding matrix is expected to be applied, and a specific bit in the bitmaps indicates a CSI-RS antenna port;

the correspondence between the CSI-RS antenna ports and the antenna ports onto which the precoding matrix is expected to be applied, is indicated by one integer, and the integer indicates a part of the antenna ports served as the CSI-RS antenna ports among the antenna ports onto which the precoding matrix is expected to be applied; or one correspondence is selected from at least one preset correspondence as the correspondence between the CSI-RS antenna ports and the antenna ports onto which the precoding matrix is expected to be applied.

15. The method as claimed in claim 14, wherein the specific bit is a non-zero bit.

16. The method according to claim 13, wherein the correspondence between the CSI-RS antenna ports and the antenna ports onto which the precoding matrix is expected to be applied, is determined by the number of antenna ports onto which the precoding matrix is expected to be applied and the number of the CSI-RS antenna ports.

17. The method as claimed in claim 12, wherein the configuration information is further indicative of, a correspondence between the CSI-RS antenna ports located in a first dimension in space and the antenna ports located in the first dimension in space onto which the precoding matrix is expected to be applied, and the correspondence between the CSI-RS antenna ports located in a second dimension in space and the antenna ports located in the second dimension in space onto which the precoding matrix is expected to be applied.

18. The method according to claim 13, wherein the configuration information is indicative of: the number K1 of CSI-RS antenna ports located in a first dimension in space, the number K2 of CSI-RS antenna ports located in a second dimension in space, the number N1 of antenna ports located in the first dimension in space onto which the precoding matrix is expected to be applied, and the number N2 of antenna ports located in the second dimension in space onto which the precoding matrix is expected to be applied; wherein each of K1, K2, N1 and N2 is an positive integer.

19. The method as claimed in claim 18, wherein the correspondence between the CSI-RS antenna ports and the antenna ports onto which the precoding matrix is expected to be applied is determined by K1, K2, N1, and N2.

20. The method as claimed in claim 18, wherein the number of CSI-RS antenna ports is K, and the number of antenna ports onto which precoding matrix is expected to be applied is N; and K1, K2, N1 and N2 satisfy either of, $$K=2*K1*K2, \text{ and } N=2*N1*N2; \text{ or}$$

$$K=2*(K1+K2), \text{ and } N=2*N1*N2.$$

* * * * *